UNITED STATES PATENT OFFICE.

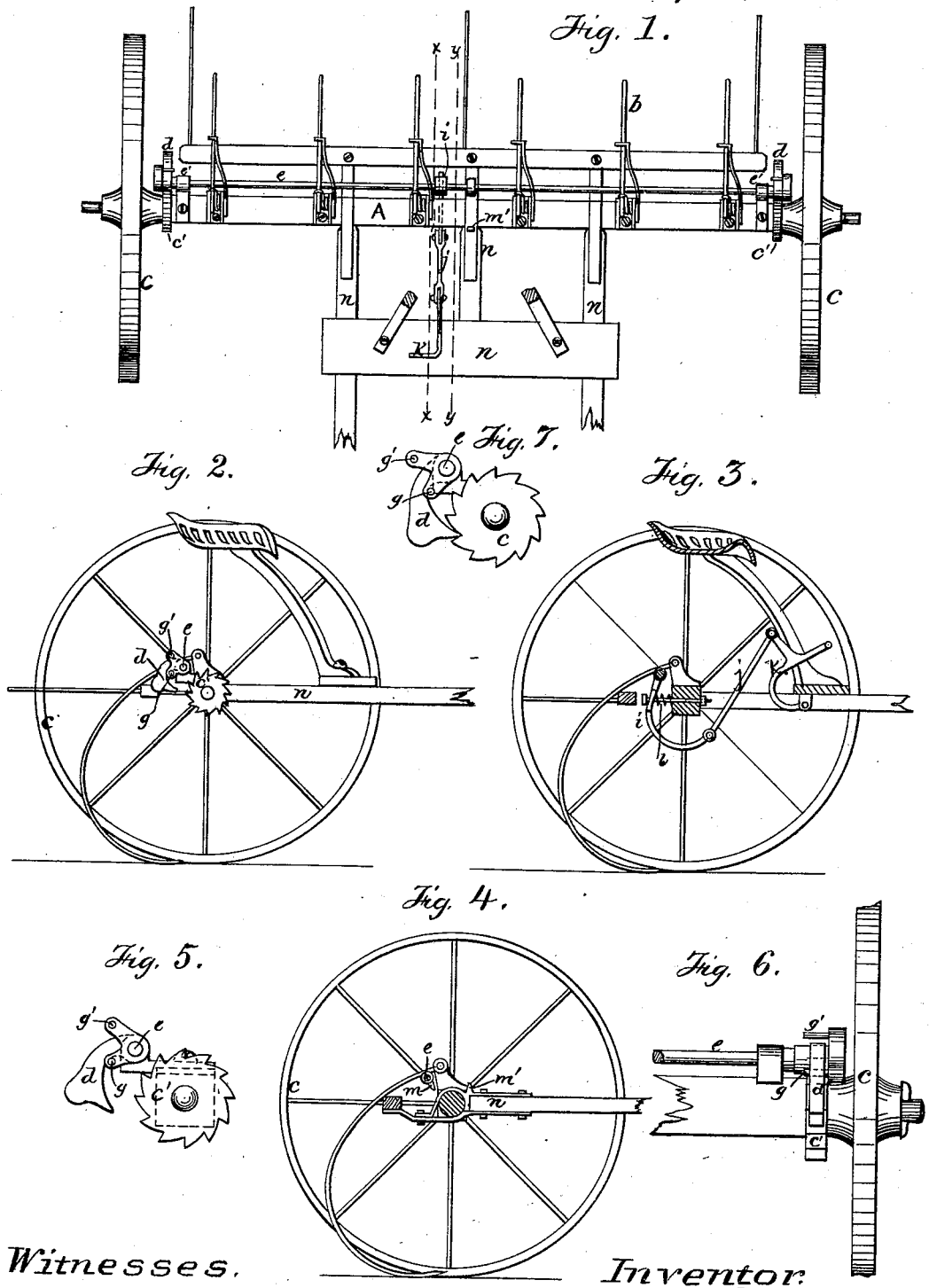

SHERMAN R. NYE, OF WINCHENDON, MASSACHUSETTS, ASSIGNOR OF ONE-HALF HIS RIGHT TO WALES ALDRICH, OF DAYTON, OHIO.

IMPROVEMENT IN HORSE HAY-RAKES.

Specification forming part of Letters Patent No. 217,897, dated July 29, 1879; application filed August 5, 1878.

*To all whom it may concern:*

Be it known that I, SHERMAN R. NYE, of Winchendon, in the county of Worcester and State of Massachusetts, have invented certain Improvements in Horse Hay-Rakes, of which the following is a specification.

This invention relates to wheel hay-rakes in which the teeth are raised to dump the accumulated load by the draft of the motive power; and it has for its object to provide simple and effective means for connecting the rake-head with the wheels for the purpose of raising the rake-teeth, and for automatically disconnecting the rake-head from the wheels when the teeth have been sufficiently elevated.

To these ends my invention consists in the improvements which I will now proceed to describe and claim.

Of the accompanying drawings, Figure 1 represents a plan view of a rake embodying my improvements. Fig. 2 represents an end view with one wheel removed. Fig. 3 represents a section on line $x\,x$ of Fig. 1. Fig. 4 represents a section on line $y\,y$ of Fig. 1. Figs. 5 and 6 represent, respectively, end and rear views of one of the ratchets, its gravitating dog, and the mechanism for raising the latter. Fig. 7 represents an end view of one of the ratchets and gravitating dogs, showing the latter engaged with the former to lift the rake-teeth.

Similar letters of reference indicate corresponding parts.

In the drawings, A represents the rake-head, to which the rake-teeth $b$ are attached in any suitable manner, said rake-head being also the axle of the rake, the wheels $c\,c$ turning on the ends thereof. The inner ends of the hubs of the wheels $c$ are provided with ratchets $c'$, rigidly attached to and turning with the hubs and wheels.

$d\,d$ represent gravitating dogs, which are hung on a suitable support suitably connected to the rake-head, said support consisting preferably of a rod, $e$, to be hereinafter described. The dogs $d$ are arranged to swing vertically on the rod $e$, and when said dogs are allowed to swing or gravitate to their normal position they engage with the teeth on the rear portions of the ratchets $c'$, as shown in Fig. 7. The teeth of the ratchets $c'$ are so formed that when the ratchets are engaged with them the rake-head will be rotated and caused to lift the teeth by the rotation of the wheels and ratchets, the dumping of the gathered load being thus effected. While the rake is gathering its load the dogs $d$ are raised and held away from the ratchets by any suitable means, preferably by the automatic devices, which may be described as follows:

The rod $e$, to which the dogs are hung, is journaled to turn in bearings $e'$, affixed to the rake-head, and is located somewhat above and in the rear of the rake-head, and is substantially parallel with the latter. At each end of the rod is a forked or V-shaped piece provided with horizontal pins $g\,g'$. The pins $g$ project under the dogs $d$ and support the latter, as will presently appear, while the pins $g'$ project over the dogs $d$, and act as guards to limit the upward motion of the dogs.

At or near the center of the rod $e$ is a downwardly-projecting curved arm or lever, $i$, rigidly attached to said rod. This arm or lever is connected by a rod, $j$, to a treadle or foot-lever, $k$, which is pivoted to the foot-board of the rake, as shown in Fig. 3.

$l$ represents a spiral spring supported on a rod attached to the rake-head, and passing through a slot in the arm $i$. This spring is interposed between the arm $i$ and the rake-head, and its function is to hold or force the arm $i$ away from the rake-head, thereby holding the rod $e$ in such position that its pins $g$ elevate and support the dogs $d$ out of the radius of the ratchets $c'$, as shown in Figs. 2, 3, and 5.

When the treadle $k$ is depressed by the operator, the arm $i$ is drawn toward the rake-head against the pressure of the spring $l$, and turns rod $e$, so that its pins $g$ are depressed, and allow the dogs $d$ to drop and engage with the ratchets, as shown in Fig. 7, the result being the rotation of the rake-head and the dumping of the load.

To limit the described rotation of the rake-head and the elevation of the teeth, I provide an automatic device consisting of a stud or projection, $m$, on the rod $e$ and another stud or projection, $m'$, arranged on the frame $n$ to form a stop against which the stud $m$ strikes when the rake-head has been sufficiently rotated.

The result of the contact of the studs $m$ and $m'$ is the partial rotation of the rod $e$ in the proper direction to cause the pins $g$ of the rod to disconnect the dogs $d$ from the ratchets $c$, when, the rake-head being released, the rake-teeth fall and resume the raking. As soon as the rake-head is released the operator releases the treadle $k$, thus allowing the spring $l$ to resume its function.

I claim as my invention—

1. The gravitating dogs $d$, combined with the rake-head A, the ratchets $c'$, and means whereby said dogs are raised and supported when not in use.

2. The rod $e$, having the pins $g$ and arm or lever $i$, and mechanism for swinging the latter in one direction, combined with the dogs $d$, the spring $l$, and the rake-head A, as set forth.

3. The combination of the rake-head A, the rod $e$, having pins $g$ and stud $m$, the gravitating dogs $d$, the ratchets $c'$, and the stud $m'$, all arranged and operating as set forth.

In testimony whereof I have signed my name to this specification in the presence of two subscribing witnesses.

SHERMAN R. NYE.

Witnesses:
 C. F. BROWN,
 GEO. W. PIERCE.